US012752523B2

(12) United States Patent
Castillo

(10) Patent No.: US 12,752,523 B2
(45) Date of Patent: Oct. 6, 2026

(54) EXTENDED PROCESS ROLL NIP

(71) Applicant: The Procter & Gamble Company, Cincinnati, OH (US)

(72) Inventor: Mario Castillo, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 108 days.

(21) Appl. No.: 18/512,394

(22) Filed: Nov. 17, 2023

(65) Prior Publication Data

US 2024/0165937 A1 May 23, 2024

Related U.S. Application Data

(60) Provisional application No. 63/594,525, filed on Oct. 31, 2023, provisional application No. 63/384,508, filed on Nov. 21, 2022.

(51) Int. Cl.
*B32B 37/00* (2006.01)
*B32B 38/06* (2006.01)

(52) U.S. Cl.
CPC .......... *B32B 37/0053* (2013.01); *B32B 38/06* (2013.01)

(58) Field of Classification Search
CPC ................. B32B 37/0053; B32B 38/06; B31F 2201/073; B31F 2201/0725; B65H 2404/1122
See application file for complete search history.

(56) References Cited

U.S. PATENT DOCUMENTS 5,257,967 B1 10/1995 Gysin
7,976,664 B2 7/2011 Lasson
10,737,456 B2 8/2020 Biagiotti

FOREIGN PATENT DOCUMENTS

DE 202007006100 U1 * 7/2007 ................ B31F 1/07

OTHER PUBLICATIONS

Era Polymers—Hardness Scales (Year: 2020).*
Hannecard. Hardness Specifications for Roller Covering. (Year: 2020).*

* cited by examiner

*Primary Examiner* — Carson Gross
(74) *Attorney, Agent, or Firm* — Richard L. Alexander

(57) ABSTRACT

A process roller is provided including an inner core and a roller cover structure adapted to be mounted on the inner core for rotation with the inner core, the roller cover structure defining an outer surface adapted to mate with at least one of a belt or a mating roller such that a nip receives at least one of a wet web or a fibrous structure, in which the roller cover structure includes an inner ring positioned about the inner core and an outer ring positioned about the outer ring, where the outer ring has a higher hardness than the inner ring and the inner ring and outer ring are formed from a rubber. Also disclosed is an apparatus that includes the corresponding process roller and a method for joining a first fibrous structure to a second fibrous structure using the corresponding apparatus.

21 Claims, 4 Drawing Sheets

EXTENDED PROCESS ROLL NIP

CROSS REFERENCE TO RELATED APPLICATIONS

This application claims the benefit of U.S. Provisional Application No. 63/384,508, filed Nov. 21, 2022, and of U.S. Provisional Application No. 63/594,525, filed Oct. 31, 2023, the entire disclosures of which are fully incorporated by reference herein.

FIELD OF THE DISCLOSURE

The subject matter of the present disclosure relates to a process roller used during the production of tissue or towel paper.

BACKGROUND

A typical process used during the production of tissue or towel paper involves embossing at least one layer of a fibrous structure using two rollers and bonding together at least two layers of material using two rollers. The duration of time when the layer or layers are being compressed together is referred to as a nip time. Desire for a faster overall production time has led to a decreased nip time, which has led to a degradation of product quality. In an effort to increase nip time while maintaining a fast production time, manufacturers have utilized a system having additional rollers. However, the use of additional rollers has a high capital cost and could require complex system updates. Beyond the need and desire for rollers that can increase nip time and, thus, increase product quality, there is a need for said rollers to be durable, such that they can endure hostilities of the papermaking process for an adequate period of time.

SUMMARY

In accordance with one aspect of the present disclosure, a process roller is provided, in which the process roller may comprise an inner core and a roller cover structure adapted to be mounted on the inner core for rotation with the inner core, the roller cover structure defining an outer surface adapted to mate with at least one of a belt or a mating roller such that a nip receives at least one of a wet web or a fibrous structure. The roller cover structure may comprise an inner ring positioned about the inner core and an outer ring positioned about the inner ring, wherein an outer surface of the outer ring defines the outer surface of the roller cover structure, wherein the outer ring may have a higher hardness than the inner ring, and wherein the inner ring and outer ring may be formed from a rubber.

In accordance with another aspect of the present disclosure, an apparatus is provided, in which the apparatus may comprise one of a mating roller or a belt and a process roller. The process roller may comprise an inner core and a roller cover structure adapted to be mounted on the inner core for rotation with the inner core. The roller cover structure may define an outer surface adapted to mate with an outer surface of the one of the mating roller or the belt to define a nip to receive one or more of a wet web or a fibrous structure. The roller cover structure may comprise an inner ring positioned about the inner core and an outer ring positioned about the inner ring, wherein an outer surface of the outer ring defines the outer surface of the roller cover structure, wherein the outer ring may have a higher hardness than the inner ring.

In accordance with another aspect of the present disclosure, a process for joining a first fibrous structure to a second fibrous structure is provided. The process may comprise providing one of a mating roller or a belt and a process roller, wherein the one of the mating roller or the belt and the process roller are in engagement with one another to define a nip therebetween. The process roller may comprise an inner core and a roller cover structure adapted to be mounted on the inner core for rotation with the inner core. The roller cover structure may comprise an inner ring positioned about the inner core and an outer ring positioned about the inner ring, wherein the outer ring may have a higher hardness than the inner ring. The process may further comprise applying adhesive to a first surface of the first fibrous structure, and passing the first and second fibrous structures through the nip concurrently with the first surface of the first fibrous structure in engagement with the second fibrous structure so to press the first and second fibrous structures together.

DETAILED DESCRIPTION

Figure 1:
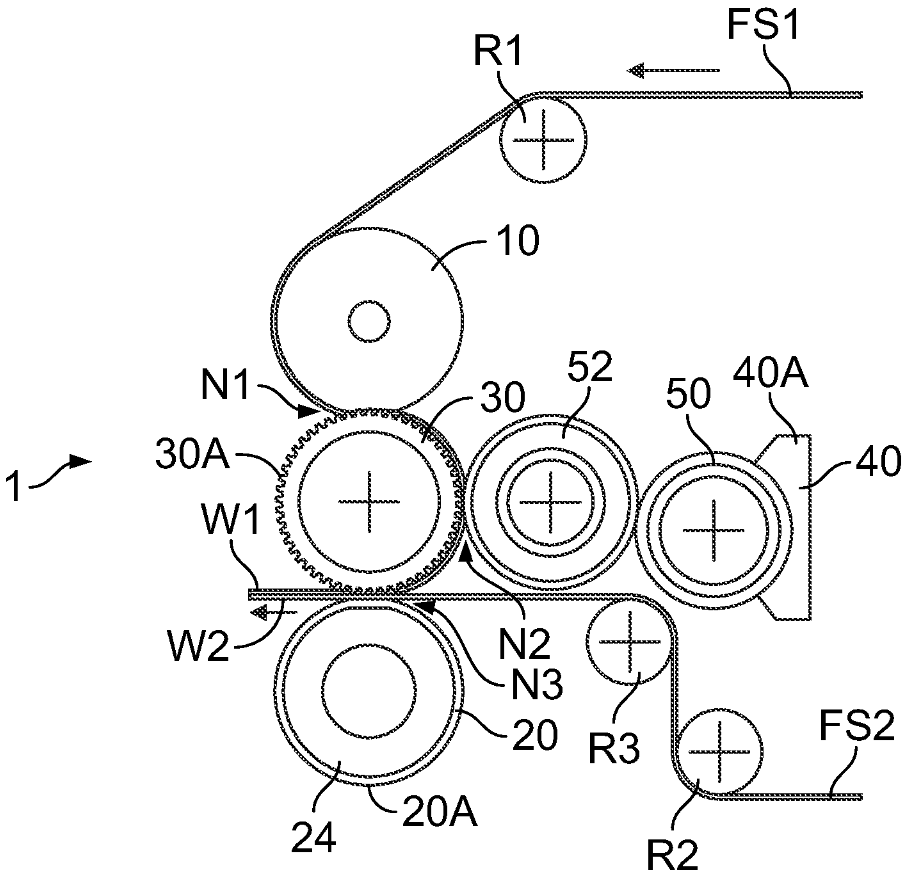
FIGS. 1 and 2 are schematic representations of apparatuses including a process roller of the present disclosure.

In the following detailed description of the preferred embodiments, reference is made to the accompanying drawings that form a part hereof, and in which is shown by way of illustration, and not by way of limitation, specific preferred embodiments of the present disclosure. It is to be understood that other embodiments may be utilized and that changes may be made without departing from the spirit and scope of the present disclosure.

Generally, fibrous structures of the present disclosure are typically made in "wet-laid" papermaking processes. In such papermaking processes, a fiber slurry, usually wood pulp fibers, is deposited onto a forming wire and/or one or more papermaking belts such that an embryonic fibrous structure is formed. After drying and/or bonding the fibers of the embryonic fibrous structure together, a fibrous structure is formed. Further processing of the fibrous structure can then be carried out after the papermaking process. For example, the fibrous structure can be wound on the reel and/or ply-bonded and/or embossed.

"Fibrous structure" as used herein means a structure that comprises a plurality of fibers. In one example, a fibrous structure according to the present disclosure means an orderly arrangement of fibers within a structure in order to perform a function. A bag of loose fibers is not a fibrous structure in accordance with the present disclosure. The terms "embryonic web," and "embryonic fibrous web" are used to describe a wet web that forms a fibrous structure after drying, i.e., a dry web. Further, fibrous structures may be rolled, interleaved, perforated, and/or packaged to form final product(s), such as a sanitary tissue product.

A "Ply" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies." for example, by being folded on itself. A ply may comprise multiple layers. Multiple plies may, for example be formed as follows: fibrous structure of the present disclosure may be combined with one or more additional fibrous structures, which is the same or different from the fibrous structures of the present disclosure to form a multi-ply sanitary tissue product; said additional fibrous structure may be combined with the fibrous structure of the present disclosure by any suitable means.

"Sanitary tissue product" as used herein means a soft, low density (i.e., <about 0.25 g/cm$^3$) fibrous structure useful as a wiping implement for post-urinary and post-bowel movement cleaning (toilet tissue), for otorhinolaryngological discharges (facial tissue), and multi-functional absorbent and cleaning uses (absorbent towels and napkins). The sanitary tissue product may be convolutedly wound upon itself about a core or without a core to form a roll of sanitary tissue product. Further, the fibrous structure making up the sanitary tissue product may be perforated to form interconnected sheets.

The term "compressible" as used herein means with respect to an inner ring of a process roller that the inner ring is compressible in a radial direction, i.e., the inner ring's thickness $T_{IR}$ is compressible. For example, an outer surface of the inner ring may deform radially inwardly a greater extent than an inner surface of the inner ring such that the outer surface deforms radially inward toward the inner surface, see FIG. 4.

The term "deformable" as used herein means with respect to an outer ring of a process roller that the outer ring is deformable inwardly, i.e., both the inner and outer surfaces of the outer ring may deform inwardly together, so as to conform to the shape of an adjacent mating roller.

Referring now to the drawings, particularly to FIG. 1, an apparatus 1 is shown comprising first, second and third guide rollers R1, R2 and R3, a pressing roller 10, a process roller 20, an embossing roller 30 (also referred to herein as a mating roller), an adhesive reservoir 40, a transfer roller 50, and an applicator roller 52. The first, second and third guide rollers R1, R2 and R3 may be driven or non-driven so as to move freely. The embossing roller 30 may be driven by a drive system (not shown) to rotate. The pressing roller 10 and process roller 20 may be caused to rotate by engagement with the embossing roller 30. The applicator roller 52 and the transfer roller 50 may be driven to rotate.

First and second fibrous structures FS1 and FS2 are provided to the apparatus 1 in the embodiment illustrated in FIG. 1. The fibrous structures FS1 and FS2 may comprise fiber structure plies, such as non-woven plies, paper plies, or like fiber structure plies. The first fibrous structure FS1 passes over the first guide roller R1, engages the pressing roller 10, and then passes through a first nip N1 defined between the first pressing roller 10 and the embossing roller 30. The pressing roller 10 may have a hardness of 50 Shore A or Puscy and Jones (P&J) hardness of 125. The embossing roller 30 may be formed from a metal, such as steel.

As the first fibrous structure FS1 moves through the first nip N1, it may be embossed by an embossing pattern 32 formed on an outer surface 30A of the embossing roller 30. Alternatively, if the mating roller 30 does not have an embossing pattern formed on the outer surface 30A, the first nip N1 may compress the first fibrous structure FS1 without embossing it. For example, the first pressing and mating rollers 10 and 30 may be used to press water out of the first fibrous structure FS1 during a papermaking process.

The first fibrous structure FS1 continues to move with the embossing roller 30 and passes through a second nip N2 defined between the embossing roller 30 and the applicator roller 52, where a first side of the first fibrous structure FS1 is coated with an adhesive 40A by the applicator roller 52. The applicator roller 52 receives the adhesive 40A from the transfer roller 50, which extends into the adhesive reservoir 40 containing the adhesive 40A. The first fibrous structure FS1 continues through a third nip N3 defined between the embossing roller 30 and the process roller 20.

The second fibrous structure FS2 passes over the second and third guide rollers R2 and R3 and into the third nip N3, such that the second fibrous structure FS2 moves generally simultaneously with the first fibrous structure FS1 through the third nip N3. As the second fibrous structure FS2 enters the third nip N3, it engages with the first side of the first fibrous structure FS1 coated with adhesive. While in the third nip N3, the first and second fibrous structures FS1 and FS2 are pressed together by the embossing roller 30 and the process roller 20. The first and second fibrous structures FS1 and FS2 exit the third nip N3 joined together as a two-ply paper product.

Figure 2:
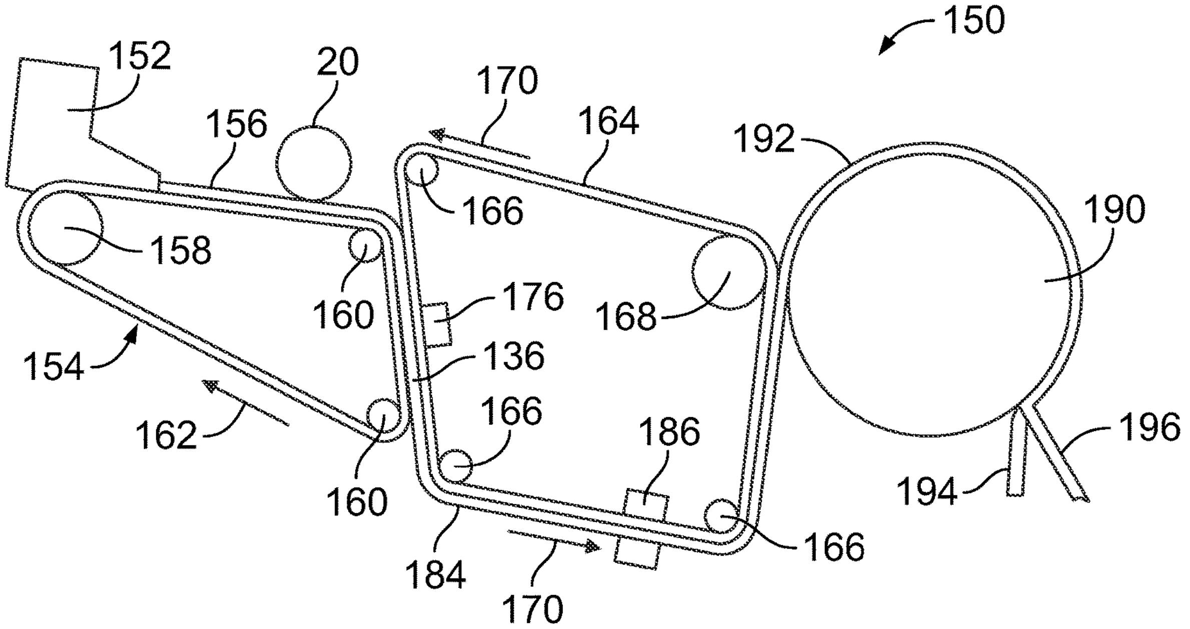

As shown in FIG. 2, an apparatus 150 for making fibrous structures may comprise supplying an aqueous dispersion of fibers (a fibrous furnish) to a headbox 152 which can be of any design known to those of skill in the art. The aqueous dispersion of fibers can include wood and non-wood fibers, northern softwood kraft fibers ("NSK"), eucalyptus fibers, southern softwood kraft (SSK) fibers, Northern Hardwood Kraft (NHK) fibers, acacia, bamboo, straw and bast fibers (wheat, flax, rice, barley, etc.), corn stalks, bagasse, abaca, kenaf, reed, synthetic fibers (PP, PET, PE, bico version of such fibers), regenerated cellulose fibers (viscose, lyocell, etc.), and other fibers known in the papermaking art, including short fibers having an average length less than 1.0 mm and including long fibers having an average length greater than 1.0 mm. From the headbox 152, the aqueous dispersion of fibers can be delivered to a foraminous member 154, which can be a Fourdrinier wire, to produce an embryonic fibrous web 156.

The foraminous member 154 can be supported by a breast roll 158 and a plurality of return rolls 160 of which only two are illustrated. The foraminous member 154, such as a belt, can be propelled in the direction indicated by directional arrow 162 by a drive means, not illustrated, at a predetermined velocity, $V_1$. Optional auxiliary units and/or devices commonly associated with fibrous structure making machines and with the foraminous member 154, but not illustrated, comprise forming boards, hydrofoils, vacuum boxes, tension rolls, support rolls, wire cleaning showers, and other various components known to those of skill in the art.

After the aqueous dispersion of fibers is deposited onto the foraminous member 154, the embryonic fibrous web 156 is formed, typically by the removal of a portion of the aqueous dispersing medium by techniques known to those skilled in the art. Vacuum boxes, forming boards, hydrofoils, and other various equipment known to those of skill in the art are useful in effectuating water removal. The embryonic fibrous web 156 can travel with the foraminous member 154 about return roll 160 and can be brought into contact with a papermaking belt 164 in a transfer zone 136, after which the embryonic fibrous web travels on the papermaking belt 164. One possible use of the inventive process rollers 20 described herein is to dispose one process roller 20 such that a nip is formed between the one process roller 20 and the foraminous member 154, prior to transfer of the embryonic fibrous web 156 to the papermaking belt 164, for the purpose of at least partially dewatering the embryonic fibrous web 156. While in contact with the papermaking belt 164, the embryonic fibrous web 156 can be deflected, rearranged, and/or further dewatered. Depending on the process, mechanical and fluid pressure differential, alone or in combination, can be utilized to deflect a portion of fibers into the deflection conduits of the papermaking belt. For example, in a through-air drying process a vacuum apparatus 176 can apply a fluid pressure differential to the embryonic web 156 disposed on the papermaking belt 164, thereby deflecting fibers into the deflection conduits of the deflection member. The process of deflection may be continued with additional vacuum pressure 186, if necessary, to even further deflect and dewater the fibers of the web 184 into the deflection conduits of the papermaking belt 164.

The papermaking belt 164 can be in the form of an endless belt. In this simplified representation, the papermaking belt 164 passes around and about papermaking belt return rolls 166 and pressure roll 168 and can travel in the direction indicated by directional arrow 170, at a papermaking belt velocity, which can be less than, equal to, or greater than, the foraminous member velocity. The pressure roll 168 presses the sheet to dewater it and to adhere the sheet to the Yankee dryer 190—so this is another place in the process that inventive process rollers 20 of the present disclosure can be used (i.e., pressure roll 168 could be replaced by process roll 20). In the present disclosure, the papermaking belt velocity is less than foraminous member velocity such that the partially-dried fibrous web is foreshortened in the transfer zone 136 by a percentage determined by the relative velocity differential between the foraminous member and the papermaking belt. Associated with the papermaking belt 164, but not illustrated, can be various support rolls, other return rolls, cleaning means, drive means, and other various equipment known to those of skill in the art that may be commonly used in fibrous structure making machines.

The fibrous web 192 can then be creped with a creping blade 194 to remove the web 192 from the surface of the Yankee dryer 190 resulting in the production of a creped fibrous structure 196 in accordance with the present disclosure. As used herein, creping refers to the reduction in length of a dry (having a consistency of at least about 90% and/or at least about 95%) fibrous web which occurs when energy is applied to the dry fibrous web in such a way that the length of the fibrous web is reduced and the fibers in the fibrous web are rearranged with an accompanying disruption of fiber-fiber bonds. Creping can be accomplished in any of several ways as is well known in the art, as the doctor blades can be set at various angles. The creped fibrous structure 196 is wound on a reel, commonly referred to as a parent roll, and can be subjected to post processing steps such as calendaring, tuft generating operations, embossing, and/or converting. The reel winds the creped fibrous structure at a reel surface velocity The papermaking belts of the present disclosure can be utilized to form discrete elements and a continuous/substantially continuous network (i.e., knuckles and pillows) into a fibrous structure during a through-air-drying operation. The discrete elements can be knuckles and can be relatively high density relative to the continuous/substantially continuous network, which can be a continuous/substantially pillow having a relatively lower density. In other examples, the discrete elements can be pillows and can be relatively low density relative to the continuous/substantially continuous network, which can be a continuous/substantially continuous knuckle having a relatively higher density. In the example detailed above, the fibrous structure is a homogenous fibrous structure, but such papermaking process may also be adapted to manufacture layered fibrous structures, as is known in the art. As discussed above, the fibrous structure can be embossed during a converting operating to produce the embossed fibrous structures of the present disclosure.

Additionally, an inventive process roller 20 as described herein may be used as a de-watering roller in a conventional wet press papermaking process, which is also known as a Dry Crepe Tissue process (not shown).

Figure 3:
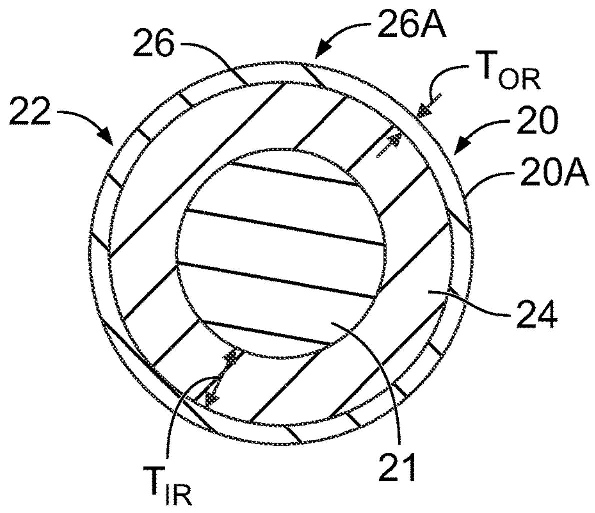
FIG. 3 depicts a cross sectional view of the process roller of FIGS. 1 and 2.

The process roller 20 includes an inner core 21 and a roller cover structure 22, see FIG. 3. The roller cover structure 22 is adapted to be mounted on the inner core 21 for rotation with the inner core 21. As discussed in further detail below, the roller cover structure 22 defines an outer surface 20A to mate with the embossing roller 30. The inner core 21 may be mounted on a rigid, rotatable shaft (not shown), such that the inner core 21 is joined to the shaft for rotation with the shaft. The inner core 21 may be formed from a metal, such as steel. If provided, the rigid shaft may be formed from a metal, such as steel.

The roller cover structure 22 comprises an inner ring 24 adapted to be fitted on the inner core 21 and may be secured to the inner core 21, such as by a friction fit, adhesive, or a fastener. The roller cover structure 22 may further comprise an outer ring 26, having an outer surface 26A defining the outer surface 20A of the roller cover structure 22. The inner ring 24 and outer ring 26, in accordance with one embodiment, may be formed, such as by molding, from a rubber material, preferably a synthetic rubber, more preferably a nitrile rubber and most preferably a hydrogenated nitrile rubber. One example of a nitrile rubber is one that is commercially available from Valley Roller, of the Maxcess Group, under the product designation Valcoat.

The outer ring 26 may have a higher hardness that the inner ring 24, where the different hardnesses may be achieved by using varying chemistries and vulcanization processes for the rubber. The hardness ratio between the outer ring 26 and the inner ring 24 is about 2:1 to about 10:1, preferably about 3:1 to about 5:1. Additionally, the inner ring 24 may have a P&J hardness between 40 and 200, preferably between 45 and 125 and the outer ring 26, may have a P&J hardness between 7 and 20, preferably between 7 and 15. The P&J scale ranges from 0 to 300, where 0 corresponds to a material that is very hard and 300 corresponds to a material that is very soft. The outer ring 26 preferably has a P&J hardness upper limit of 20. If the outer ring 26 has a higher P&J hardness value, the outer ring 26 may be too soft such that the outer ring 26 may deform or compress into pattern indentations or cavities 31 of the embossing roller 30. The fibrous structure FS1 may be embossed once when it passes through the nip N1. If the material forming the outer ring 26 is too soft, the material of the outer ring 26 may deform or compress into the pattern indentations/cavities 31 of the embossing roller 30 and emboss the first and second fibrous structures FS1 and FS2 (the first fibrous structure FS1 would be embossed a second time), thereby causing double embossing, which may degrade the two-ply paper product exiting the third nip N3.

Both the inner ring 24 and the outer ring 26 preferably have a hardness less than 80 Shore D.

A thickness $T_{IR}$ of the inner ring 24 may greater than a thickness TOR of the outer ring 26. For example, a thickness of the inner ring 24 and a thickness of the outer ring 26 may have a ratio of about 2:1 to about 10:1. The inner ring 24 may have a thickness of from about 0.25 inches to about 1.25 inches and preferably about 0.5 inch and the outer ring 26 may have a thickness of from about 0.125 inches to about 0.75 inches and preferably about 0.125 inch. While not intending to be bound by theory, for a generally constant nip force, it is believed that the combination of both the hardness and thickness of the inner ring 24 and outer ring 26 determine the nip width $W_{NIP}$.

Figure 4:
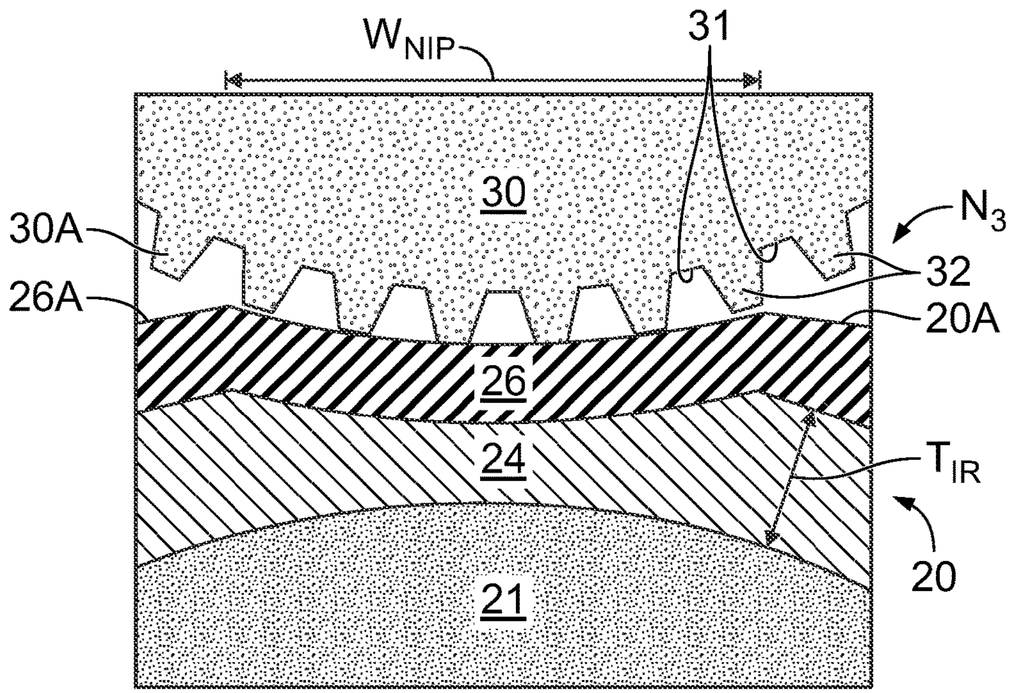
FIG. 4 shows us close up view of a nip formed between a mating roller and the process roller of FIGS. 1 and 2.

FIG. 4 depicts the third nip N3 between the process roller 20 and the embossing roller 30. As noted above, during operation of the apparatus 1, the first and second fibrous structures FS1 and FS2 pass into the third nip N3, defined by the outer surface 20A of the process roller 20 engaging or mating with the outer surface 30A of the embossing roller 30. Where the outer surface 20A of the process roller 20 and the outer surface 30A of the embossing roller 30 engage, the outer ring 26 deforms to conform to the curvature of outer surface 30A of the embossing roller 30 to increase the nip width $W_{NIP}$, see FIG. 4. The outer ring 26 deforms to conform to the curvature of the outer surface 30A of the embossing roller 30 because the embossing roller 30 is formed from a metal having a hardness equal to or greater than the hardness of the outer ring 26 and further the embossing roller 30 has a much greater thickness than that of the outer ring 26. While the outer ring 26 deforms to conform to the outer surface 30A of the embossing roller 30, the outer ring 26 has sufficient hardness such that it does not deform or compress into the pattern indentations or cavities 31 of the outer surface 30A the embossing roller 30, thereby avoiding double embossing. Because the inner ring 24 is softer than the outer ring 26, the inner ring 24 compresses so as to allow the outer ring 26 to deform to the curvature of outer surface 30A of the embossing roller 30 to increase the nip width $W_{NIP}$, i.e., the outer ring 26 deforms into the inner ring 24 causing the inner ring 24 to compress. Presuming a constant rotational speed of the process roller 20 and embossing roller 30, when the nip width $W_{NIP}$ increases, the amount of time that the first and second fibrous structures FS1, FS2 are compressed in the third nip N3 is increased, which may increase the bond between the first and second fibrous structures FS1 and FS2. Also, an increase in nip width $W_{NIP}$ may allow the process speed of the apparatus 1 to be increased, including the rotational speed of the process roller 20 and embossing roller 30, which improves efficiency and productivity.

Figure 5:
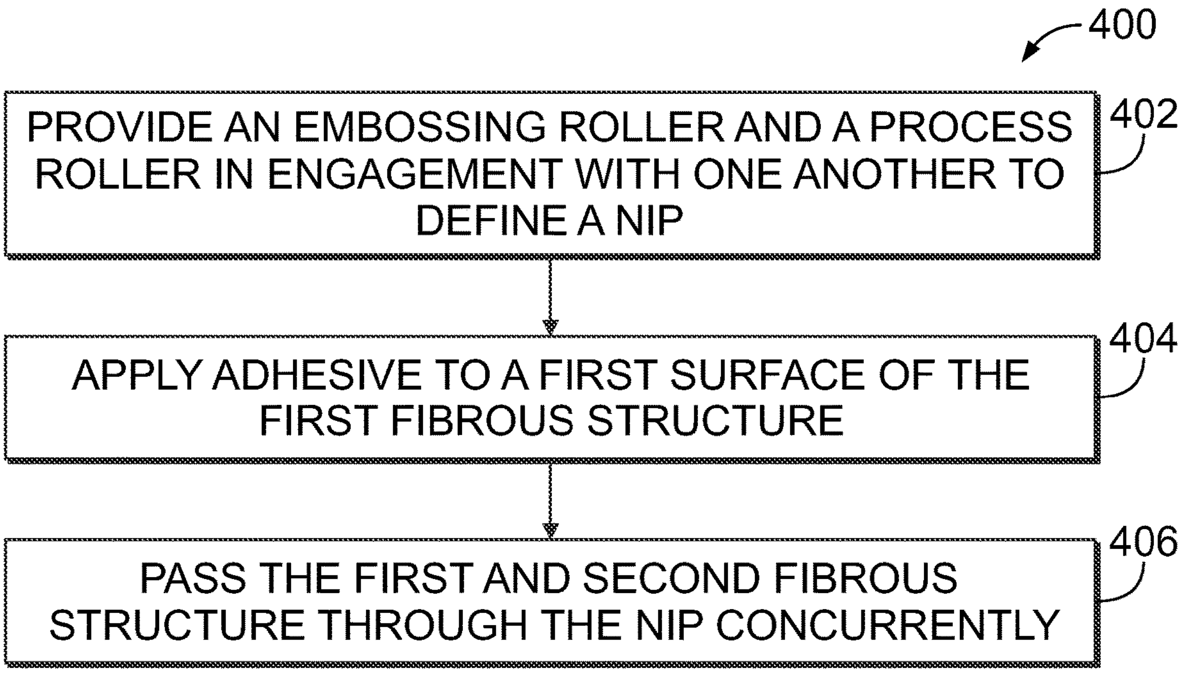
FIG. 5 is a flowchart illustrating an exemplary process for joining a first fibrous structure to a second fibrous structure, in accordance with the present disclosure.

FIG. 5 illustrates an exemplary method 400 for joining a first fibrous structure FS1 to a second fibrous structure FS2, in accordance with the present disclosure. At step 402, a mating roller 30 and a process roller 20 are provided in engagement with one another to define a nip N3 therebetween. As discussed above, the process roller 20 comprises an inner core 21 and a roller cover structure 22 adapted to be mounted on the inner core 21 for rotation with the inner core 21. The roller cover structure 22 comprises an inner ring 24 positioned about the inner core 21 and an outer ring 26 positioned about the inner ring 24. The outer ring 26 may have a higher hardness than the inner ring 26. At step 404, an adhesive 40A is applied to a first surface of the first fibrous structure FS1. At step 406, the first and second fibrous structures FS1 and FS2 are passed through the nip N3 concurrently, with the first surface of the first fibrous structure FS1 in engagement with the second fibrous structure FS2 so to press the first and second fibrous structures FS1 and FS2 together.

Durability

Figure 6:
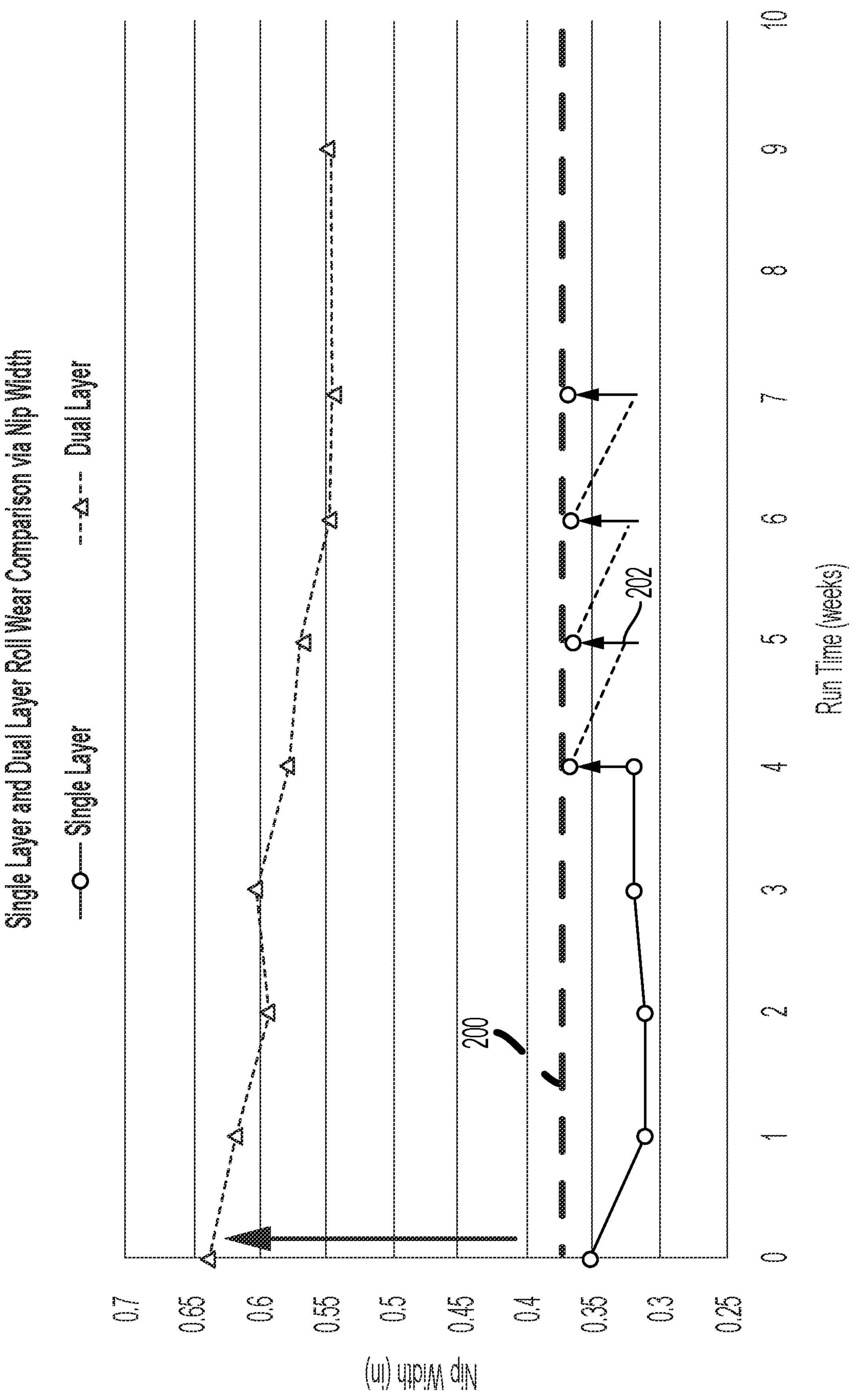
FIG. 6 is a graph illustrating the outcome of the testing between the single layer and dual layer rubber rolls, comparing the rate at which the nip width decreases.

Increased deformation of rubber materials is generally associated with an increase in heat generation due to the hysteresis characteristics of the rubber. To better understand the impact of increased deformation and heat generation, testing was performed on small-scale equipment that allows for continual operation of a patterned steel roll pressed (nipped) against a rubber coated roll. The equipment was then operated in the nipped position and allowed to run for an extended period of 7 weeks. As means of comparison, one roll was covered with a single rubber layer (or ring) with a hardness of 7 P&J and a thickness of ⅝". After the elapsed time of 7 weeks had passed, a second rubber covered roll was installed, which was covered with an inner rubber layer (or ring) with a hardness of 45 P&J and a thickness of ½" and an outer rubber layer (or ring) with a hardness of 15 P&J and a thickness of ⅛". The graph of FIG. 6 shows the outcome of the testing between the single layer and dual layer rubber rolls, comparing the rate at which the nip width decreases. Regarding the graph of FIG. 6, although the dual-layer rubber roll was running at elevated temperatures and at significantly higher deformation due to the increased nip width (versus the original nip width 200), it was unexpectedly wearing at a much slower rate compared to the single layer rubber cover (note: nip width resets 202 of the single layer rubber roll). The data indicates a 2× longer roll life of the dual layer compared to the single layer, which presents an impactful benefit on process reliability and equipment utilization. Applicants hypothesize that the dual layer achieves superior results because 1) higher deformation equals more heat, but the hydrogenated nitrile chemistry (e.g., HBNR) is more thermally stable than traditional rubbers used in these processes; and 2) the wider nip disperses the same forces over a wider area (pressure=force over area, so, for example, 10 pounds over 1 inch vs 0.5 inches). Traditionally, those of ordinary skill in the art attempted to deal with the challenge of a wider nip by using a softer monolayer; but, as said above, there is a limit to how soft one can make the layer because it starts embossing the paper. The other part of the challenge is dealing with the heat that is generated; this is traditionally dealt with by cooling the roll. For these reasons, Applicant's approaches disclosed herein are contrary to the traditional treatment of these challenges and are novel, especially in the combinations disclosed herein. Further, those of ordinary skill in the art have shared that the load and compression requirements of papermaking won't support the deformation difference between the base layer (e.g., steel or hard rubber) and the soft (vs. the base layer) inner layer; as well as the deformation difference between the harder (vs. the inner layer) outer layer and the softer (vs. the outer layer) inner layer. Those of ordinary skill in the art have expressed fears around delamination of the roll and layers as disclosed herein.

Testing

Testing was performed to compare the nip width of various process rollers 20 made in accordance with the present disclosure against a base, rubber process roller comprising a single rubber layer formed using a nitrile rubber, with a hardness of 7 P&J and a thickness of ⅝". The samples process rollers 20 made in accordance with the present disclosure and the base process roller had a diameter of 6" and an axial length of 4". For the process rollers formed in accordance with the present disclosure, the overall thickness of the roller cover structure 22 was ⅝", with the inner ring 24 being ½" thick and the outer ring 26 being ⅛" of an inch thick. All of the process rollers formed in accordance with the present disclosure were formed from nitrile rubber and had the hardness values listed in Table 1 below.

TABLE 1

| Sample Hardness (P&J) | | |
|---|---|---|
| Sample | Outer Ring Hardness | Inner Ring Hardness |
| Sample 1 | 7 | 15 |
| Sample 2 | 15 | 45 |
| Sample 3 | 15 | 75 |
| Sample 4 | 15 | 115 |
| Sample 5 | 15 | 125 |
| Sample 6 | 7 | 75 |
| Sample 7 | 7 | 125 |

The samples were subjected to force of 1,500 lbf for one second and the nip widths were measured. The various widths were then compared to the width of the base, rubber process roller and the results are listed in Table 2 below.

TABLE 2

| Nip Width Comparison | | |
|---|---|---|
| Sample | Nip Width (mm) | Nip Width Multiplier |
| Base | 6 | 1 |
| Sample 1 | 8.24 | 1.37 |
| Sample 2 | 16.54 | 2.76 |
| Sample 3 | 21.72 | 3.62 |
| Sample 4 | 27.09 | 4.52 |
| Sample 5 | 24.19 | 4.03 |
| Sample 6 | 15.33 | 2.56 |
| Sample 7 | 17.31 | 2.89 |

Beyond the embodiments of Samples 1-7, it may be desirable to have the outer ring at a thickness of ¼" and the inner ring at a thickness of ⅜". It may also be desirable to have the outer ring at a thickness of ¼" and the inner ring at a thickness of ½" when a larger process roll diameter is desired. Additionally, the outer ring may have a thickness of ⅛" and the inner ring may have a thickness of ⅝" when a larger process roll diameter and a wider nip width is desired.

The description of the present disclosure has been presented for purposes of illustration and description, but is not intended to be exhaustive or limited only to the embodiments in the form disclosed. Many modifications and variations will be apparent to those of ordinary skill in the art without departing from the scope and spirit of the disclosure.

Having thus described embodiments of the present application in detail, it will be apparent that modifications and variations are possible without departing from the scope of the subject matter of the present disclosure defined in the appended claims.

What is claimed is:

1. A process roller comprising:
an inner core;
a roller cover structure adapted to be mounted on the inner core for rotation with the inner core, the roller cover structure defining an outer surface adapted to mate with at least one of a belt or a mating roller such that a nip receives at least one of a wet web or a fibrous structure, the roller cover structure comprising:
an inner ring positioned about the inner core; and
an outer ring positioned about the inner ring, wherein an outer surface of the outer ring defines the outer surface of the roller cover structure,
wherein a ratio between a Pusey & Jones (P&J) hardness value of the inner ring to the P&J hardness value of the outer ring is about 2:1 to about 28:1;
wherein the inner ring is thicker than the outer ring such that a thickness ratio between the inner ring and the outer ring is about 2:1 to about 10:1;
wherein the P&J hardness ratio and the thickness ratio are selected to increase a width of the nip, wherein the width of the nip is measured based on a constant force of 1500 lbf applied for one second to the process roller;
wherein the inner ring has a thickness of from about 0.25 inches to about 1.25 inches, and wherein the outer ring has a thickness of from about 0.125 inches to about 0.75 inches, and wherein the thickness ratio between the inner ring and the outer ring is from about 3:1 to about 5:1; and
wherein the inner ring and outer ring are formed from a rubber.

2. The process roller of claim 1, wherein the inner ring and outer ring are formed from a synthetic rubber.

3. The process roller of claim 2, wherein the synthetic rubber is a nitrile rubber.

4. The process roller of claim 1, wherein the inner ring and the outer ring are formed from materials with a hardness less than 80 Shore D.

5. The process roller of claim 1, wherein:
the inner ring has the Pusey and Jones (P&J) hardness between 40-200; and
the outer ring has the P&J hardness between 7-20.

6. The process roller of claim 1, wherein the outer ring has a maximum value of the P&J hardness of 20.

7. The process roller of claim 1, wherein the P&J hardness ratio and the thickness ratio are selected to increase the width of the nip based on:
the outer surface of the outer ring being configured to deform to conform to a curvature of an outer surface of the mating roller such that both an inner surface and the outer surface of the outer ring deform inwardly together so as to conform to the curvature of the outer surface of the mating roller;
the outer surface of the outer ring not being configured to deform or compress into pattern indentations or cavities of the outer surface of the mating roller; and
the inner ring being configured to compress to allow the outer ring to deform and conform to the curvature of the outer surface of the mating roller such that the thickness of the inner ring is compressible in a radial direction based on an outer surface of the inner ring being configured to deform radially inward by a greater extent than an inner surface of the inner ring such that the outer surface of the inner ring deforms radially inward toward the inner surface of the inner ring.

8. The process roller of claim 1, wherein the ratio of the P&J hardness value of the inner ring to the P&J hardness value of the outer ring is about 3:1 to about 5:1.

9. An apparatus comprising:
one of a mating roller or a belt; and
a process roller comprising:
an inner core;
a roller cover structure adapted to be mounted on the inner core for rotation with the inner core, the roller cover structure defining an outer surface adapted to mate with an outer surface of the one of the mating roller or the belt to define a nip to receive one or more of a wet web or a fibrous structure, the roller cover structure comprising:

an inner ring positioned about the inner core; and an outer ring positioned about the inner ring, wherein an outer surface of the outer ring defines the outer surface of the roller cover structure, wherein the outer ring has a lower Pusey & Jones (P&J) hardness value than the inner ring and wherein the inner ring has a greater thickness than the outer ring so to increase a width of the nip, wherein the width of the nip is measured based on a constant force of 1500 lbf applied for one second to the process roller; and wherein the inner ring has a thickness of from about 0.25 inches to about 1.25 inches, and wherein the outer ring has a thickness of from about 0.125 inches to about 0.75 inches, and wherein the thickness ratio between the inner ring and the outer ring is from about 3:1 to about 5:1.

10. The apparatus of claim 9, wherein the inner ring and outer ring are formed from a synthetic rubber.

11. The apparatus of claim 9, wherein a ratio of the P&J hardness value between the inner ring and the outer ring is about 2:1 to about 28:1.

12. The apparatus of claim 9, wherein:

the inner ring has the Pusey and Jones (P&J) hardness between 40-200; and the outer ring has the P&J hardness between 7-20.

13. The apparatus of claim 12, wherein the outer ring has a sufficient hardness such that the outer ring does not deform into cavities of the mating roller.

14. A process for joining a first fibrous structure to a second fibrous structure, the process comprising;

providing one of a mating roller or a belt and a process roller, wherein the one of the mating roller or the belt and the process roller are in engagement with one another to define a nip therebetween, wherein the process roller comprises:

an inner core;

a roller cover structure adapted to be mounted on the inner core for rotation with the inner core, the roller cover structure comprising: an inner ring positioned about the inner core; and an outer ring positioned about the inner ring, wherein the outer ring has a lower Pusey & Jones (P&J) hardness value than the inner ring and wherein the inner ring has a greater thickness than the outer ring;

applying adhesive to a first surface of the first fibrous structure;

passing the first and second fibrous structures through the nip concurrently with the first surface of the first fibrous structure in engagement with the second fibrous structure so to press the first and second fibrous structures together;

wherein the lower P&J hardness value of the outer ring and the greater thickness of the inner ring are selected to increase a width of the nip, wherein the width of the nip is measured based on a constant force of 1500 lbf applied for one second to the process roller; and wherein the inner ring has a thickness of from about 0.25 inches to about 1.25 inches, and wherein the outer ring has a thickness of from about 0.125 inches to about 0.75 inches, and wherein the thickness ratio between the inner ring and the outer ring is from about 3:1 to about 5:1.

15. The process of claim 14, wherein the P&J hardness value of the outer ring is lower than the inner ring such that the inner ring compresses and the outer ring deforms at the nip to increase the length of the nip while the outer ring has a sufficient hardness such that the outer ring does not deform into cavities of the mating roller.

16. The process of claim 15, wherein the inner ring and outer ring are formed from a synthetic rubber.

17. The process of claim 15, wherein the outer ring has the P&J hardness value between 7-20.

18. The process of claim 15, wherein a P&J hardness ratio between the inner ring and the outer ring is about 2:1 to about 28:1.

19. The process of claim 15, wherein:

the inner ring has the Pusey and Jones (P&J) hardness between 40-200; and the outer ring has the P&J hardness between 7-20.

20. The process of claim 15, further comprising increasing an amount of time that the first and second fibrous structures are compressed during the passing step based on the increase in the width of the nip and increasing a bond between the first and second fibrous structures based on the increasing step.

21. The process of claim 15, further comprising increasing a process speed including a rotational speed of the process roller and the embossing roller based on the increase in the width of the nip.

* * * * *